United States Patent
Bishnoi et al.

(10) Patent No.: US 10,990,951 B2
(45) Date of Patent: Apr. 27, 2021

(54) SYSTEMS AND METHODS FOR A PAYMENT CARD WITH MULTIPLE FUNDING SOURCES

(71) Applicant: Mastercard International Incorporated, Purchase, NY (US)

(72) Inventors: Vikas Bishnoi, Jodhpur (IN); Shubham Bijawat, Gurgaon (IN); Shubham Kumar, Gurugram (IN)

(73) Assignee: Mastercard International Incorporated, Purchase, NY (US)

( * ) Notice: Subject to any disclaimer, the term of this patent is extended or adjusted under 35 U.S.C. 154(b) by 85 days.

(21) Appl. No.: 16/251,641

(22) Filed: Jan. 18, 2019

(65) Prior Publication Data
US 2020/0234269 A1   Jul. 23, 2020

(51) Int. Cl.
| | |
|---|---|
| *G06Q 20/10* | (2012.01) |
| *G06Q 20/22* | (2012.01) |
| *G06Q 20/20* | (2012.01) |
| *G06Q 20/40* | (2012.01) |
| *G06Q 20/34* | (2012.01) |

(52) U.S. Cl.
CPC ......... *G06Q 20/227* (2013.01); *G06Q 20/204* (2013.01); *G06Q 20/3572* (2013.01); *G06Q 20/4012* (2013.01)

(58) Field of Classification Search
USPC .......................................................... 705/41
See application file for complete search history.

(56) References Cited

U.S. PATENT DOCUMENTS

| | | | |
|---|---|---|---|
| 2002/0103753 A1* | 8/2002 | Schimmel | G06Q 20/04 705/39 |
| 2007/0012762 A1 | 1/2007 | Van Overbeke et al. | |
| 2007/0267479 A1* | 11/2007 | Nix | G06Q 20/10 235/379 |

(Continued)

OTHER PUBLICATIONS

U.S. Representative Steve Buyer (R-IN) Holdshearing on Veterans' Affairs Departmentsmart Card Initiatives ; Lanham (Year: 2004).*

(Continued)

*Primary Examiner* — Hani M Kazimi
*Assistant Examiner* — Hatem M Ali
(74) *Attorney, Agent, or Firm* — Hovey Williams LLP

(57) ABSTRACT

A system and computer-implemented method includes the operations of transmitting a cold reset signal to a multiple-funding source payment card and receiving a first answer-to-reset message therefrom. The first answer-to-reset message includes governing rules for performing a single-swipe transaction. The operation also includes receiving payment account details for a first payment account in accordance with the governing rules. A first PIN associated with the first payment account is input by a cardholder and a first payment authorization request message for approval of the single-swipe transaction is transmitted. Upon receipt of a payment declined response message, a warm reset signal is transmitted to the payment card. A second answer-to-reset message is received including payment account details for a second payment account. The cardholder inputs a second PIN associated with the second payment account and a second payment authorization request message for approval of the single-swipe transaction is transmitted.

14 Claims, 8 Drawing Sheets

(56) References Cited

U.S. PATENT DOCUMENTS

| | | | |
|---|---|---|---|
| 2008/0010189 A1* | 1/2008 | Rosenberger | G06Q 20/10 |
| | | | 705/39 |
| 2008/0301041 A1 | 12/2008 | Bruk | |
| 2010/0036770 A1* | 2/2010 | Fourez | G06Q 20/105 |
| | | | 705/41 |
| 2013/0304643 A1 | 11/2013 | Hirka et al. | |
| 2014/0279476 A1* | 9/2014 | Hua | G06Q 20/341 |
| | | | 705/41 |
| 2014/0284383 A1 | 9/2014 | Rodriguez | |
| 2016/0217455 A1 | 7/2016 | Hosny et al. | |
| 2016/0314451 A1* | 10/2016 | Martin | G06Q 20/405 |

OTHER PUBLICATIONS

A Dozen Problems With Applied Customer Measurement Grisaffe, Doug.Journal of Consumer Satisfaction, Dissatisfaction and Complaining Behavior; Provo vol. 17, (2004): 1-15 (Year: 2004).*

How the Web Can Boost Debt Collections Browning, Michael.Bank Technology News; New York vol. 18, Iss. 6, (Jun. 2005): 55. (Year: 2005).*

PCT International Search Report and Written Opinion from PCT Application No. PCT/US2019/065347 entitled Systems and Methods for a Payment Card With Multiple Funding Sources (dated Apr. 9, 2020).

* cited by examiner

| OPERATING SYSTEM 316 | PAYMENT ACCOUNT 1 302 | PIN 1 308 | FINANCIAL APPLICATION A 318 |
|---|---|---|---|
| CRYPTOGRAPHIC KEYS 314 | PAYMENT ACCOUNT 2 304 | PIN 2 310 | FINANCIAL APPLICATION B 318 |
| MEMORY COMPONENT 202 | PAYMENT ACCOUNT 3 306 | PIN 3 312 | FINANCIAL APPLICATION C 318 |

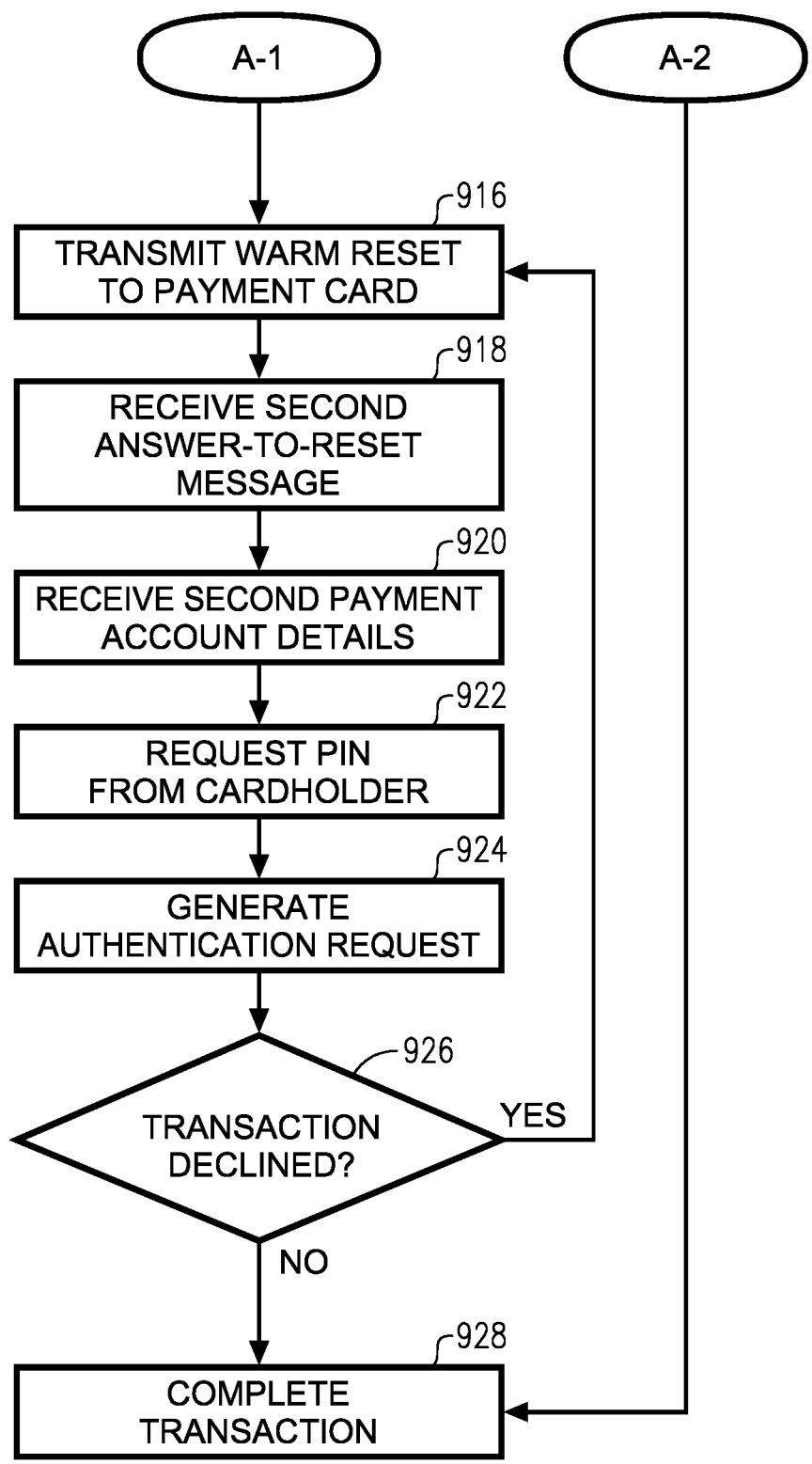

SYSTEMS AND METHODS FOR A PAYMENT CARD WITH MULTIPLE FUNDING SOURCES

FIELD OF THE DISCLOSURE

The field of the disclosure relates generally to a payment card associated with multiple funding sources and, more particularly, to systems and methods for providing user selection among multiple funding sources via single swipe of a payment card.

BACKGROUND OF THE DISCLOSURE

A typical consumer may have several payment cards for performing payment card transactions, including for example, a debit card and one or more credit cards. Carrying several payments cards can be cumbersome. In addition, at times a consumer may face issues such as insufficient funds or credit limit exceeded for certain ones of their payment cards. A user may perform a transaction with a payment card and have the transaction declined. The consumer then must use another payment card, which makes the payment process cumbersome and can take a lot more time. In addition, the consumer may face embarrassment and/or humiliation when switching payment cards and trying to find a payment card that is successful for the transaction.

BRIEF DESCRIPTION OF THE DISCLOSURE

This summary is not intended to identify essential features of the present invention and is not intended to be used to limit the scope of the claims. These and other aspects of the present invention are described below in greater detail.

In one aspect, a computer-implemented method for switching payment accounts during a single-swipe transaction using a multiple-funding source payment card is presented. The method includes transmitting a cold reset signal to the multiple-funding source payment card and receiving a first answer-to-reset message from the multiple-funding source payment card. The first answer-to-reset message includes governing rules for performing the single-swipe transaction. The method also includes receiving payment account details for a first payment account in accordance with the governing rules. Furthermore, the method includes receiving a first PIN input by a cardholder. The first PIN is associated with the first payment account. The method then transmits a first payment authorization request message for approval of the single-swipe transaction. The method includes receiving a payment declined response message. Upon receipt of the payment declined response message, the method includes transmitting a warm reset signal to the multiple-funding source payment card in accordance with the governing rules and receiving a second answer-to-reset message from the multiple-funding source payment card. Moreover, the method includes receiving payment account details for a second payment account in accordance with the governing rules. In addition, the method includes receiving a second PIN input by the cardholder. The second PIN is associated with the second payment account. Additionally, the method includes transmitting a second payment authorization request message for approval of the single-swipe transaction.

In another aspect, a system for switching payment accounts during a single-swipe transaction is provided. The system includes a multiple-funding source payment card including a micromodule thereon. The micromodule includes a memory storing at least payment account details for a first payment account having a first PIN associated therewith, payment account details for a second payment account having a second PIN associated therewith, and governing rules for performing the single-swipe transaction. The system also includes a point-of-sale device having a payment card reader component. The point-of-sale device is configured to transmit a cold reset signal to the micromodule of the multiple-funding source payment card. The point-of-sale device receives a first answer-to-reset message from the micromodule. The first answer-to-reset message includes the governing rules. The point-of-sale device is also configured to receive the payment account details for the first payment account in accordance with the governing rules and to request from a cardholder, via input into the point-of-sale device, the first PIN. The point-of-sale device transmits a first payment authorization request message for approval of the single-swipe transaction, and in response, may receive a payment declined response message. In response to the payment declined response message, the point-of-sale device transmits a warm reset signal to the micromodule in accordance with the governing rules. A second answer-to-reset message from the micromodule is received by the point-of-sale device. In addition, the point-of-sale device receives the payment account details for the second payment account in accordance with the governing rules and requests from the cardholder, via input into the point-of-sale device, the second PIN. The point-of-sale device transmits a second payment authorization request message for approval of the single-swipe transaction.

In yet another aspect, a computer-implemented method for updating a multiple-funding source payment card is provided. The method includes the operations of presenting to a cardholder options for updating the multiple-funding source payment card, receiving from the cardholder a selected option of the presented one or more options, performing one or more operations of the selected option to generate user selected changes to the multiple-funding source payment card, and writing the user selected changes to the multiple-funding source payment card.

BRIEF DESCRIPTION OF THE DRAWINGS

Embodiments of the present invention are described in detail below with reference to the attached drawing figures, wherein:

FIGS. 9A and 9B are flowcharts illustrating a computer-implemented method for switching payment accounts during a single-swipe transaction using the multiple-funding source payment card shown in FIG. 1.

The figures are not intended to limit the present invention to the specific embodiments they depict. The drawings are not necessarily to scale. Like numbers in the Figures indicate the same or functionally similar components.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments but is not necessarily included. Thus, particular implementations of the present disclosure can include a variety of combinations and/or integrations of the embodiments described herein.

Broadly characterized, the present disclosure relates to multiple-funding source payment cards and systems and methods to facilitate a single-swipe transaction using a multiple-funding source payment card. A multiple-funding source payment card may have two or more payment accounts and/or cards stored thereon, each payment account having a unique PIN associated therewith. During a transaction, the multiple-funding source payment card may be swiped, tapped, or dipped a single time. Governing rules encoded on a micromodule of the multiple-funding source payment card instructs a point-of-sale (POS) device to attempt to process the transaction using a first payment account. The rules also instruct the POS to attempt to process the transaction using a subsequent payment account stored on the card without the need to restart the transaction (i.e., swipe, tap, or dip the payment card a second time). The priority of the payment accounts is set by the cardholder and may be adjusted by the cardholder using, for example, an ATM and/or banking application. The cardholder may also add and/or delete payment accounts as desired. The multiple-funding source payment card with governing rules for single-swipe transactions facilitates reducing time and frustration for making transactions.

Figures 1, 3:
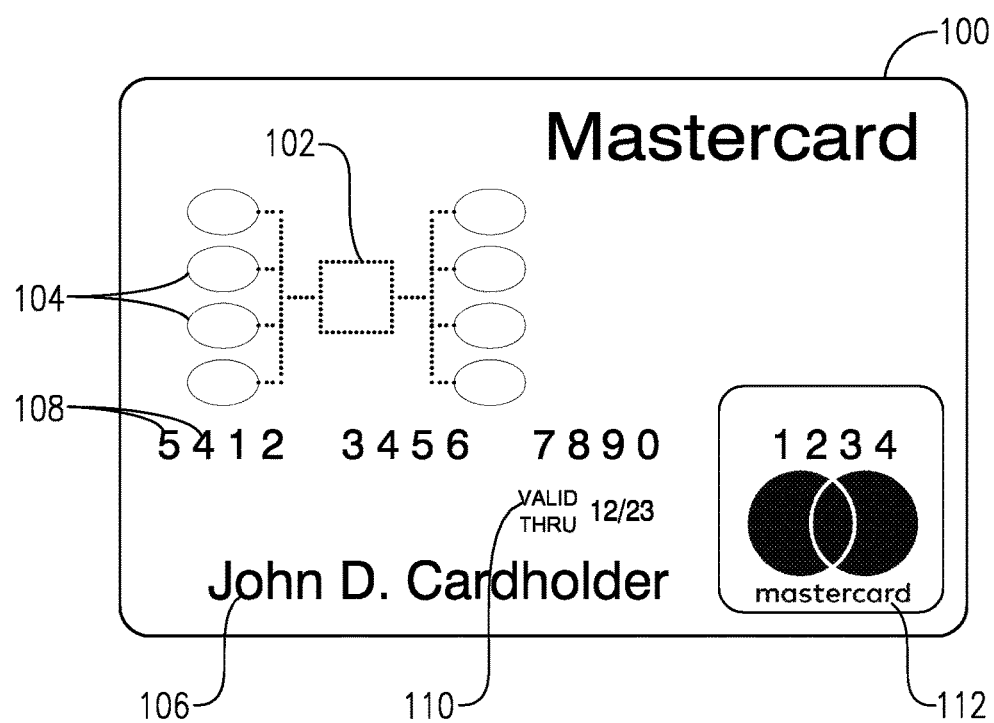
FIG. 1 is a schematic front view of a multiple-funding source payment card.
FIG. 3 is a data diagram of a memory component of the micromodule shown in FIG. 2.

FIG. 1 is a schematic front view of a multiple-funding source payment card 100. In the exemplary embodiment, the payment card 100 includes an embedded integrated circuit (IC) or micromodule 102 that stores and transmits transaction data between electronic devices. The micromodule 102 includes a single silicon integrated circuit chip with memory 202 (shown in FIG. 2) and a processor 204 (shown in FIG. 2). Alternatively, in some embodiments, the micromodule 102 may only include memory with non-programmable logic. In the exemplary embodiment, the transaction data stored on the micromodule 102 is associated with one or more payment accounts linked to respective funding sources, and as such, is a multiple-funding source payment card requiring only a single swipe, tap, or dip to process a transaction.

Figure 4:
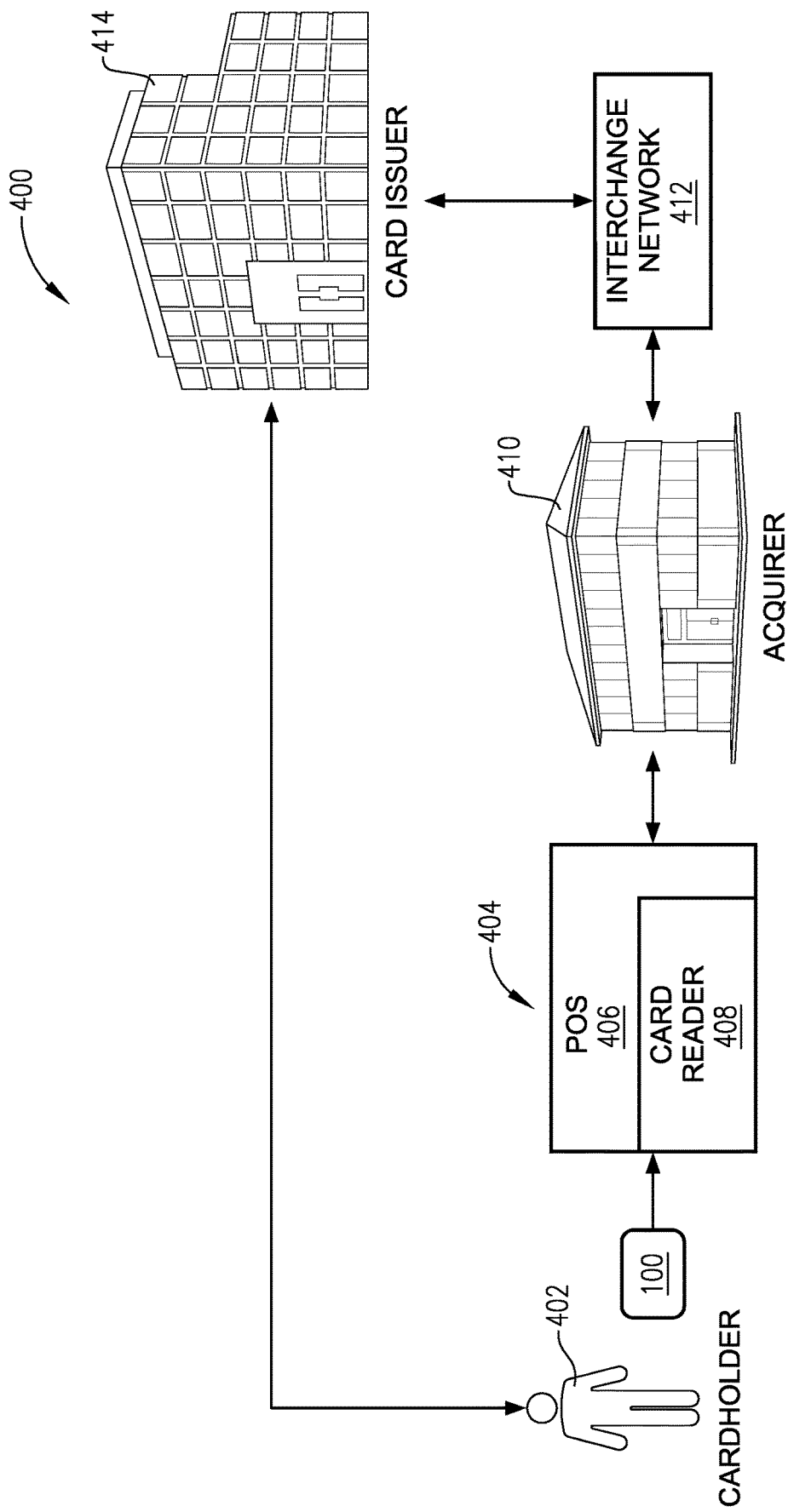
FIG. 4 is a block diagram of an exemplary payment card network system that may process the multiple-funding source payment card shown in FIG. 1.

As shown in FIG. 1, the micromodule 102 includes a plurality of electrical contacts 104 for communication between the payment card 100 and a POS terminal 406 (shown in FIG. 4). In the exemplary embodiment, the micromodule 102 includes eight (8) electrical contacts 104. The ISO/IEC 7816-2 standard includes assignments for at least power supply voltage (VCC), reset (RST) used to reset the microprocessor, clock signal (CLK), serial input/output (I/O), and ground (GRD) signals for the electrical contacts 104. In some embodiments, the micromodule 102 may include fewer or more electrical contacts 104.

In the exemplary embodiment, the payment card 100 may be configured as a credit card, a debit card, and/or a stored value card (i.e., a payment card containing monetary value that can be transferred when a cardholder performs a payment transaction). As shown in FIG. 1, the payment card 100 preferably includes a cardholder's name 106 and a logo 112 of a financial company whose services are used by the cardholder (e.g., Mastercard®). In addition, the payment card 100 may include a primary account number (PAN) 108 and an expiration date 110. The PAN may correspond to a primary account included on the payment card 100.

Figure 2:
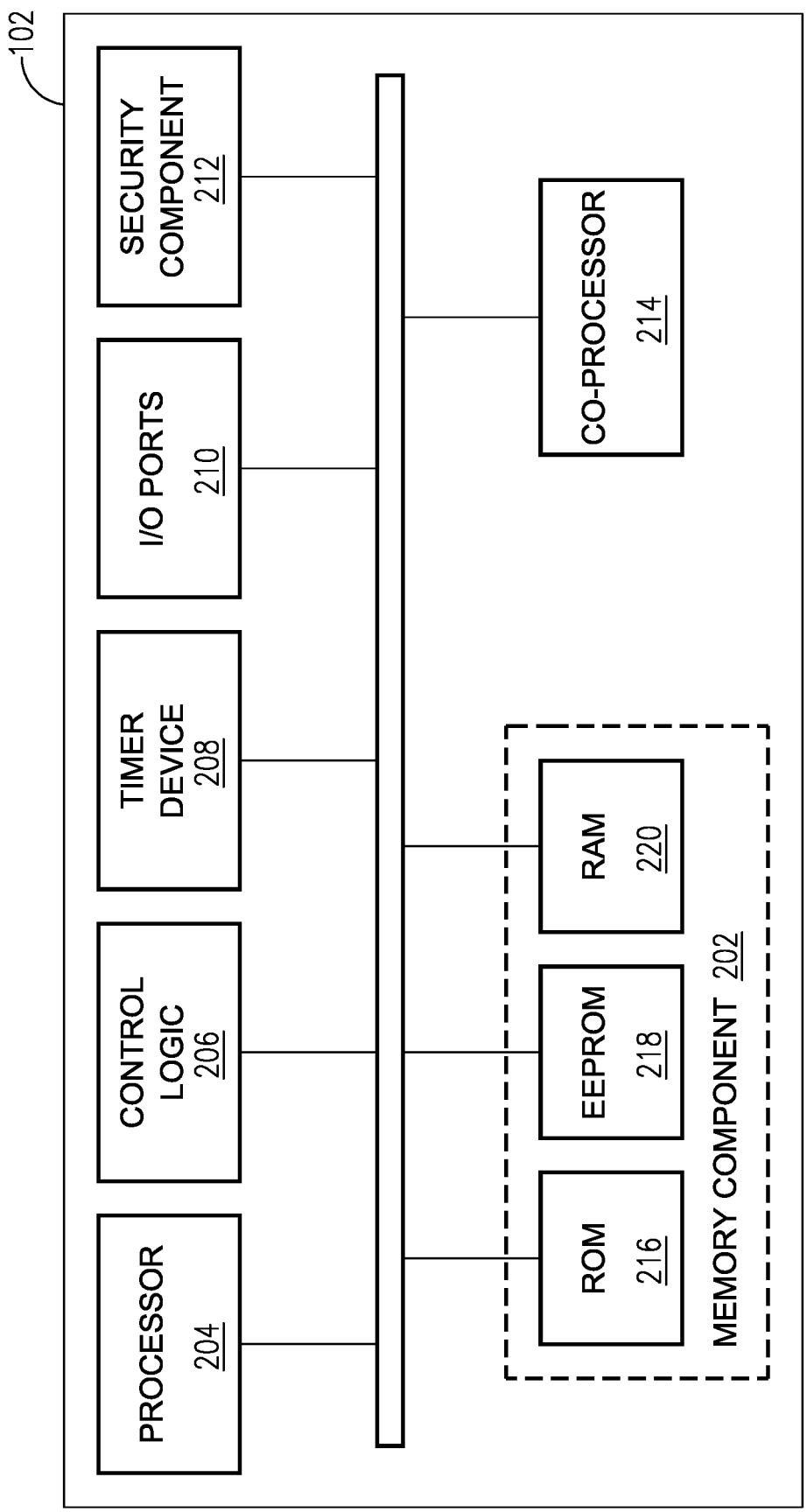
FIG. 2 is a block diagram of the micromodule of the multiple-funding source payment card shown in FIG. 1.

FIG. 2 is a block diagram of the micromodule 102. In the exemplary embodiment, the micromodule 102 includes a memory component 202, a processor 204, control logic 206, a timer device 208, input/output ports 210, a security component 212, and a co-processor 214. The control logic 206 is configured to operate in conjunction with the processor 204 to provide control for handling communications between the memory component 202 and the input/output ports 210. The timer device 208 facilitates providing a timing reference signal for the processor 204 and the control logic 206. The security component 212 preferably provides fusible links (not shown) that connect the input/output ports 210 to internal circuitry (not shown) for testing during manufacturing. The fusible links (not shown) are subsequently broken after completion of testing to facilitate limiting access to sensitive circuit areas. The co-processor 214 is configured to perform complex computations in real time, such as those required by cryptographic algorithms.

The memory component 202 may include different types of memory, such as volatile and non-volatile memory and read-only and programmable memory. For example, as shown in FIG. 2, the memory component 202 may include read-only memory (ROM) 216, electrically erasable programmable read-only memory (EEPROM) 218, and random-access memory (RAM) 220.

FIG. 3 is a data diagram of the memory component 202. In the exemplary embodiment, the memory component 202 stores unique transaction data such as one or more payment accounts 302, 304, and 306 linked to respective funding sources. In addition, the memory component 202 stores a unique PIN 308, 310, and 312 corresponding to each stored payment account 302, 304, and 306, respectively. The unique PINs 308, 310, and 312 may be used to lock and unlock access to the payment accounts on the payment card 100 to facilitate a single swipe, tap, or dip during a transaction. Furthermore, the payment card 100 includes cryptographic keys 314. The cryptographic keys 314 may be any type of known cryptographic keys generated by a cryptographic algorithm, such as private keys of public-key pairs. The cryptographic keys 314 are used for authentication of the payment card 100 and the transaction data stored in the micromodule 102. The unique PINs 308, 310, and 312 and the cryptographic keys 314 are preferably stored in a secure area of the ROM 216 or the EEPROM 218.

In the exemplary embodiment, the memory component 202 also stores an operating system 316 of the payment card 100 and one or more financial applications 318, such as financial applications A, B, and/or C. For example, the one or more payment accounts 302, 304, and 306 may include a Mastercard debit account, a VISA credit account, and a Discover credit account. In such an instance, the financial application A may be the Mastercard debit application, financial application B may be the VISA credit application, and financial application C may be the Discover credit application. The operating system 316 loads and executes the financial applications 318 and provides file management and other basic card services to the financial applications 318. In addition, the operating system 316 handles transmission of an answer-to-reset (ATR) message in response to a reset signal, as described further herein. In one embodiment, the operating system 316 is preferably stored in a secure area of ROM 216.

Each respective financial application 318 may include program files and associated data files, which may be stored in the EEPROM 218. The financial application 318 may be written either in the native programming code of the processor 204 or it may be written in a higher-level language that must be translated before it is executed on the processor 204. The use of a higher-level language facilitates enabling the financial application 318 to execute or run on multiple hardware platforms without any need for re-writing.

FIG. 4 is a block diagram of an exemplary payment card network system 400. In the exemplary embodiment, the payment card network system 400 may be utilized by consumers and merchants as part of a process of performing transactions concurrent with delivery of goods or services. In addition, the payment card network system 400 is a payment card account system including the multiple-funding source payment card 100, which a cardholder 402 may use either to conduct electronic transactions and/or record payments for electronic transactions related to purchase of a merchant's goods or services.

The payment card network system 400 enables payment-by-card transactions in which merchants 404, acquirers 410, and/or card issuers 414 do not need to have a one-to-one relationship. Although parts of the payment card network system 400 are presented in one arrangement, other embodiments may include the same or different parts arranged otherwise, depending, for example, on authorization processes for purchase transactions, communication between computing devices, etc.

In the example embodiment, the payment card network system 400 generally includes the multiple-funding source payment card 100, merchants 404, acquirers 410, issuers 414, and an interchange network 412 coupled in communication via a communications network (not shown). The communications network includes, for example and without limitation, one or more of a local area network (LAN), a wide area network (WAN) (e.g., the Internet, etc.), a mobile network, a virtual network, and/or any other suitable public and/or private network capable of facilitating communication among the payment card 100, the merchants 404, the acquirers 410, the issuers 414, and/or the interchange network 412. In some embodiments, the communications network may include more than one type of network, such as a private payment transaction network provided by the interchange network 412 to the acquirers 410 and the issuers 414 and, separately, the public Internet, which may facilitate communication between the payment card 100, the merchants 404, the interchange network 412, and the acquirers 410, etc.

Embodiments described herein may relate to a payment card system, such as a credit card payment system using the Mastercard® interchange network. (Mastercard is a registered trademark of Mastercard International Incorporated.) The Mastercard interchange network is a set of proprietary communications standards promulgated by Mastercard International Incorporated for the exchange of financial transaction data and the settlement of funds between financial institutions that are members of Mastercard International Incorporated. As used herein, financial transaction data includes at least one unique primary account number (PAN) associated with an account holder using a payment card issued by an issuer and purchase data representing a purchase made by the cardholder, including a type of merchant, amount of purchase, date of purchase, and other data, which may be transmitted between any parties of the payment card network system 400.

In a typical payment card system, a financial institution called the "issuer" issues a payment card, such as a credit card or debit card, to a consumer such as the cardholder 402, who uses the payment card to tender payment for a purchase from the merchant 404. The merchant 404 is typically associated with products, for example, and without limitation, goods and/or services, that are offered for sale and are sold to the cardholder 402. The merchant 404 includes, for example, a physical location and/or a virtual location such as an Internet-based store-front.

In the exemplary embodiment, the payment card 100 includes multiple financial accounts, such as payment accounts 302, 304, and 306 (shown in FIG. 3). In one embodiment, the cardholder 402 may input information from one or more financial accounts to be stored on the payment card for example, by inputting the information into an automated teller machine (ATM), visiting a bank, using an online banking interface, using a mobile device, etc. The information may then be written to the payment card 100 using any suitable payment card writing device (e.g., an ATM, chip encoder, mobile device, etc.). In a preferred embodiment, the information is written to the payment card 100 and stored as separate funding accounts on the payment card using a cardholder mobile device 502, shown in FIG. 5. In another embodiment, the payment card 100 may be preloaded or preprogrammed by the issuer with the information corresponding to the multiple financial accounts.

To accept payment from the cardholder 402, the merchant 404 must normally establish an account with a financial institution that is part of the payment card network system 400. This financial institution is usually called the "merchant bank," the "acquiring bank," or the acquirer 410. When the cardholder 402 submits payment for a purchase with the payment card 100, the merchant 404 requests authorization from the acquirer 410 for the purchase. The request may be performed over a telephone but is usually performed using the POS terminal 406 that reads the cardholder's account information from the micromodule 102 and communicates electronically with the transaction processing computers of the acquirer 410. More specifically, the transaction data is transmitted to the merchant 404, for example, via a payment card reader 408 (broadly, a card acceptance device (CAD)) that is part of the POS terminal 406. The micromodule 102 stores more data than a magnetic stripe card and may be programmed to transmit governing rules for transactions and only relevant transaction data (e.g., selected payment account information). Known encryption techniques facilitate securing the transaction data and the processor facilitates the micromodule 102 being programmed for different transaction processes.

The payment card 100 is inserted into the payment card reader 408 with a direct connection to the micromodule 102 on the surface of the payment card 100. The transmission of the transaction data (e.g., governing rules and/or payment account information) is via the physical contact points of the payment card reader 408 with the micromodule 102.

In some embodiments, the acquirer 410 may authorize a third party to perform transaction processing on its behalf. In this case, the POS terminal 406 will be configured to communicate with the third party rather than the acquirer 410, as described above. Such a third party is usually called a "merchant processor," an "acquiring processor," or a "third party processor."

Using the interchange network 412, computers of the acquirer 410 or merchant processor will communicate with computers of the issuer 414 to determine whether the cardholder's account is in good standing and whether the purchase is covered by the cardholder's available credit line. Based on these determinations, the request for authorization will be declined or accepted. If the request is accepted, an authorization code is issued to the merchant 404. If the request is declined, the POS terminal 406 may prompt the cardholder 402 to enter a PIN associated with a different account stored on the payment card 100. The merchant 404 then requests authorization from the acquirer 410 for the purchase using the newly entered account information.

When a request for authorization is accepted, the available credit line of the cardholder's account is decreased. Normally, a charge for a payment card transaction is not posted immediately to the cardholder's account because bankcard associations, such as Mastercard International Incorporated, have promulgated rules that do not allow the merchant 404 to charge, or "capture," a transaction until the purchased goods are shipped or the purchased services are delivered. However, with respect to at least some card transaction (e.g., debit card transactions), a charge may be posted at the time of the transaction. When the merchant 404 delivers the purchased products, the merchant 404 captures the transaction, for example, by appropriate data entry procedures on a point-of-sale terminal. This may include bundling of approved transactions daily for standard retail purchases. If the cardholder 402 cancels a transaction before it is captured, a "void" is generated. If the cardholder 402 returns goods after the transaction has been captured, a "credit" is generated. In some instances, if the cardholder 402 did not authorize the transaction, such as a previously cancelled recurring payment or a card-not-present account-on-file transaction, a "chargeback" is generated. The interchange network 412 and/or the issuer 414 stores the transaction card information, such as, and without limitation, a type of merchant, a merchant identifier, a location where the transaction was completed, an amount of purchase, and a date and time of the transaction, in a transaction database associated with the interchange network 412 and/or the issuer 414 respectively.

After a purchase has been made, a clearing process occurs to transfer additional transaction data related to the purchase among the parties to the transaction, such as the acquirer 410, the issuer 414, and the interchange network 412. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer 414, the cardholder's account is decreased. Normally, a charge is posted immediately to the cardholder's account. The interchange network 412 transmits the approval to the acquirer 410 for distribution of goods/services or information, or cash in the case of an ATM.

After a transaction is authorized and cleared, the transaction is settled among the merchant 404, the acquirer 410, and the issuer 414. Settlement refers to the transfer of financial data or funds among the merchant's account, the acquirer 410, and the issuer 414 related to the transaction. Usually, transactions are captured and accumulated into a "batch," which is settled as a group. More specifically, a transaction is typically settled between the issuer 414 and the interchange network 412, and then between the interchange network 412 and the acquirer 410, and then between the acquirer 410 and the merchant 404. It should be appreciated that more or less information related to transactions, as part of either authorization, clearing, and/or settling, may be included in the transaction data and stored within the transaction database, at the merchant 404, the acquirer 410, the payment network 412, and/or the issuer 414. Further, transaction data, unrelated to a particular payment account, may be collected by a variety of techniques, and similarly stored within the transaction database.

In some embodiments, cardholders 402 involved in the transactions described herein may be prompted to agree to legal terms associated with their payment accounts, for example, during enrollment in such payment accounts, etc. As such, the cardholder 402 may voluntarily agree to allow the merchants 404, the issuers 414, the interchange network 412, etc., to utilize data collected during enrollment and/or collected relating to processing the transactions, subsequently for one or more of the purposes described herein.

Furthermore, as illustrated in FIG. 4, the cardholder 402 may communicate with the issuer 414 directly, for example, via a network connection such as the Internet, a telephone system, a physical bank location, etc. Such communication facilitates the cardholder 402 adding, deleting, and/or modifying the one or more payment accounts 302, 304, and 306 stored on the payment card 100, as is described further herein.

Figure 6:
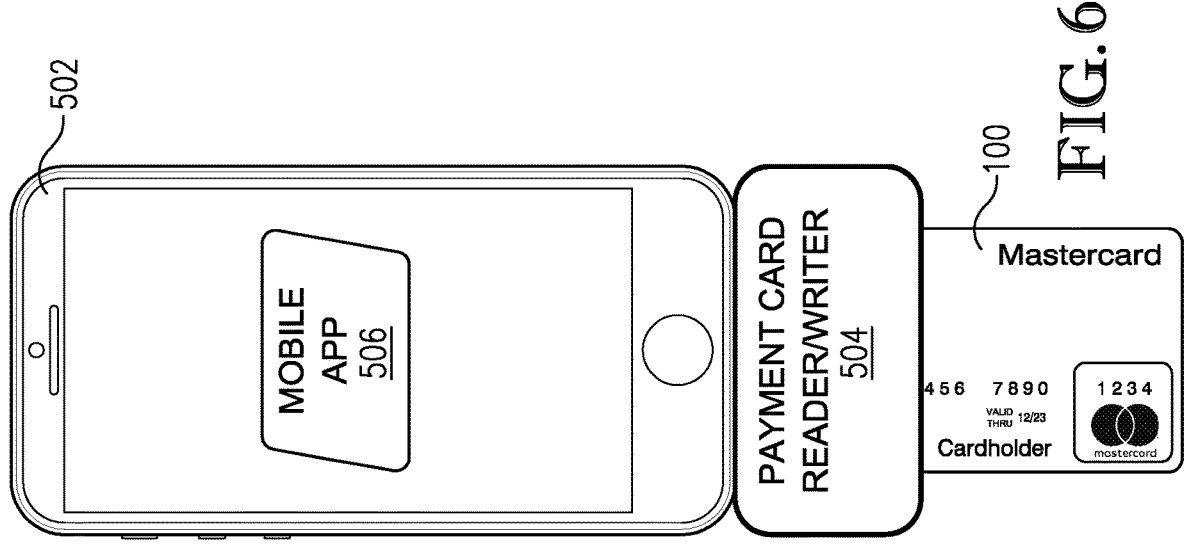
FIG. 6 is a block diagram illustrating another example of the cardholder mobile device physically writing to the multiple-funding source payment card shown in FIG. 1, using a payment card reader/writer.
Figure 5:
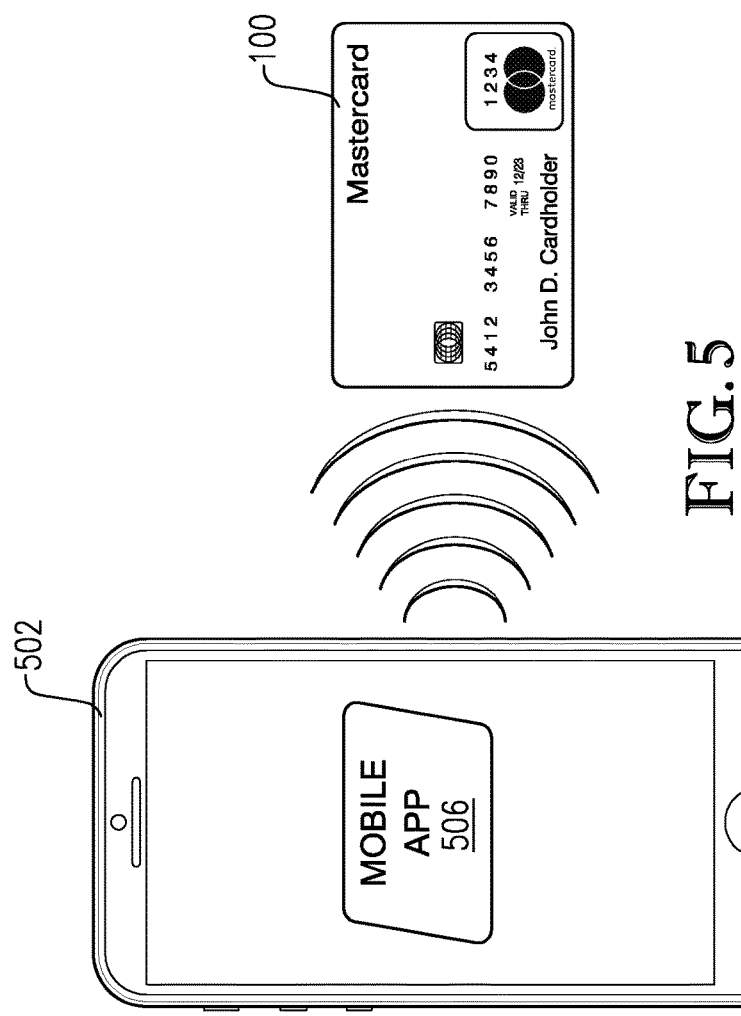
FIG. 5 is a block diagram illustrating an example of a cardholder mobile device wirelessly writing to the multiple-funding source payment card shown in FIG. 1.

As described above, the payment account information may be written to the payment card 100 using any suitable payment card writing device. In the most preferable embodiment, however, the payment card 100 may be written by the cardholder 402 using a cardholder mobile device 502. FIG. 5 is a block diagram illustrating an example embodiment of the cardholder mobile device 502 wirelessly writing to the payment card 100. FIG. 6 is a block diagram illustrating another example embodiment of the cardholder mobile device 502 physically writing to the payment card 100 using a payment card reader/writer 504 (or CAD). The cardholder mobile device 502 includes a mobile app 506 installed thereon to facilitate a cardholder, such as the cardholder 402

(shown in FIG. 4), adding or deleting a payment account, such as payment accounts 302, 304, and 306 (shown in FIG. 3), adjusting payment account priority order, and/or otherwise updating payment account information. For example, as described herein, the cardholder 402 may store several payment cards (i.e., payments accounts) on the payment card 100, each requiring that the cardholder input a discrete PIN to access a payment card for a transaction. The priority order of the payment cards may be selected by the cardholder 402 when the payment cards are added. The mobile app 506 allows the cardholder mobile device 502 to be used to communicate with the payment card 100 to enable the cardholder 402 to change the PINs associated with the payment cards and/or the priority order at any point.

In the embodiment shown in FIG. 5, the payment card 100 has near-field communication (NFC) and/or Bluetooth® technology built in, which allows for local wireless communication. The NFC and/or Bluetooth technology allows the payment card 100 to connect to the cardholder mobile device 502. This allows the cardholder 402 to update the payment card 100 "on-the-go," without needing to visit an ATM or a physical bank. In the embodiment shown in FIG. 6, the cardholder mobile device 502 includes the payment card reader/writer 504, which allows for the payment card 100 to be inserted therein. The payment card reader/writer 504 physically contacts the electrical contacts 104, which allows the payment card reader/writer 504 to read and/or write to the micromodule 102 to facilitate the cardholder 402 updating the payment card 100 "on-the-go," without needing to visit an ATM or bank.

Generating the Multiple-Funding Source Payment Card

Figure 7:
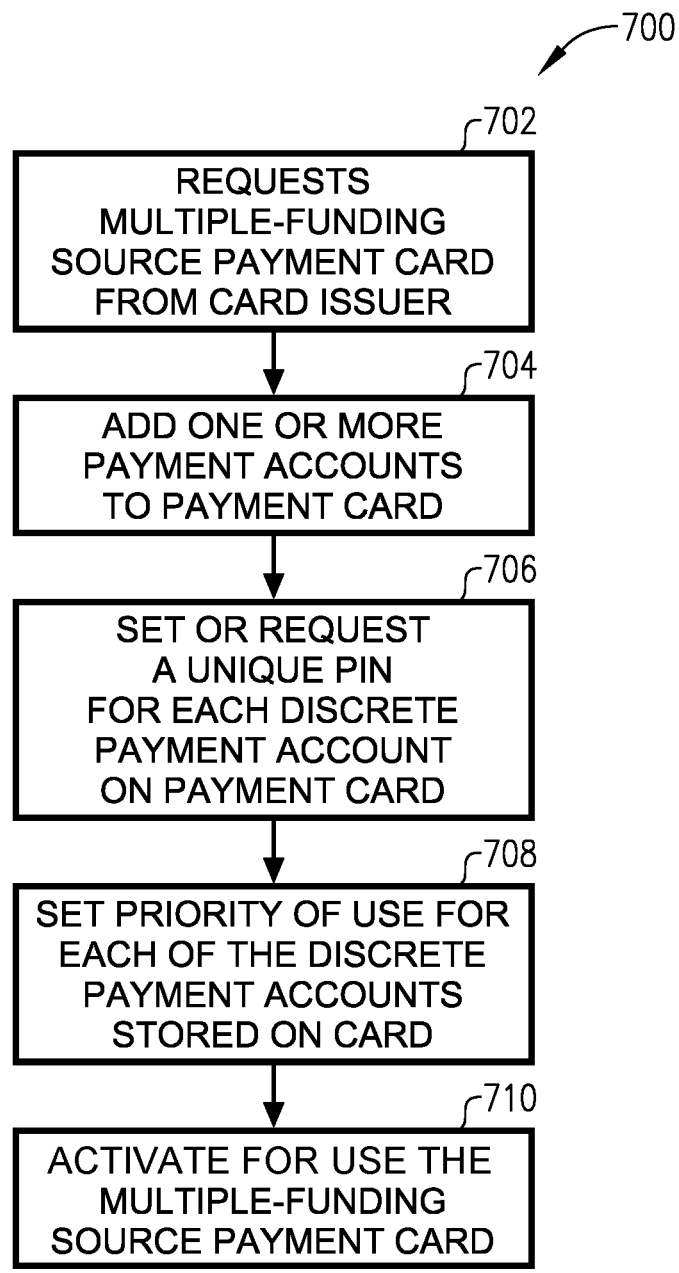
FIG. 7 is a flowchart illustrating a computer-implemented method for generating a multiple-funding source payment card, such as the multiple-funding source payment card shown in FIG. 1.

FIG. 7 is a flowchart illustrating an exemplary computer-implemented method 700 for generating a multiple-funding source payment card, such as the payment card 100. The operations described herein may be performed in the order shown in FIG. 7 or may be performed in a different order. Furthermore, some operations may be performed concurrently as opposed to sequentially. In addition, some operations may be optional.

The computer-implemented method 700 is described below, for ease of reference, as being executed by exemplary devices and components introduced with the embodiments illustrated in FIGS. 1-6. In one embodiment, the method 700 may be implemented by an issuer, such as the issuer 414 (shown in FIG. 4). In the exemplary embodiment, the method 700 relates to the generation of the multiple-funding source payment card 100 (shown in FIG. 1). While operations within the method 700 are described below regarding the issuer 414, the method 700 may be implemented on other such computing systems and/or devices through the utilization of processors, transceivers, hardware, software, firmware, or combinations thereof. However, a person having ordinary skill will appreciate that responsibility for all or some of such actions may be distributed differently among parties (e.g., the acquirer or merchant) and/or other computing devices without departing from the spirit of the present disclosure.

The computer-implemented method 700 facilitates a cardholder, such as the cardholder 402 (shown in FIG. 4), to request or register the payment card 100 with a card issuer. At an operation 702, the cardholder 402 requests a multiple-funding source payment card, such as payment card 100, from a card issuer, such as the issuer 414. The cardholder 402 may request the payment card 100, for example, using an online banking interface with the issuer 414, via an issuer telephone system, at an ATM, and/or any other banking application or system of the issuer that enables the cardholder to request the payment card 100 as described herein.

As part of the request, the cardholder 402 may add one or more payment accounts at operation 704, such as the payment accounts 302, 304, and 306 (shown in FIG. 3), which may be linked to different respective funding sources. Various account data may be supplied to the issuer to facilitate adding a payment account to the payment card 100. For example, and without limitation, the cardholder may be asked to supply the payment account or card number (e.g., the PAN), the cardholder name on the account, the account expiration date, a card verification value (CVV) number, and/or any other discretionary issuer data. Alternatively, as described above, the cardholder 402 may add the one or more payment accounts using, for example, an ATM or the cardholder mobile computing device 502 (shown in FIG. 5).

At operation 706, the cardholder 402 may set or request a unique PIN number be assigned to each of the distinct payment accounts, such as the payment accounts 302, 304, and 306, stored on the payment card 100. As described, the cardholder may select his or her own unique PIN be set for each payment account or may request that a unique PIN number be assigned to each payment account. If requesting a unique PIN, the PIN may be randomly and/or dynamically generated, for example, by the issuer 414 and associated with a specific payment account. The PINs facilitate providing a layer of security against unauthorized use of each distinct account stored on the payment card. In addition, the unique PINs facilitate cardholder selection of the payment account for use during a transaction event.

At operation 708, the cardholder 402 selects or sets a priority of use of each of the stored payment accounts on the payment card 100. For example, and without limitation, the cardholder may select to have the payment accounts 302, 304, and 306 stored on the payment card 100 in a desired order of use, for example, when completing a transaction. The cards may be stored such that a transaction attempts to use payment account 304 before payment account 306, and payment account 302 before payment account 304, for example. The priority of use may be adjusted by the cardholder at any time as is described further herein.

At operation 710, upon receipt of the payment card 100, the cardholder 402 may activate the payment card 100 for use by verifying receipt and/or authenticating his or her identity with the card issuer 414, in any manner that is typical in the art.

Adding, Deleting, Adjusting Priority of Payment Accounts

Figure 8:
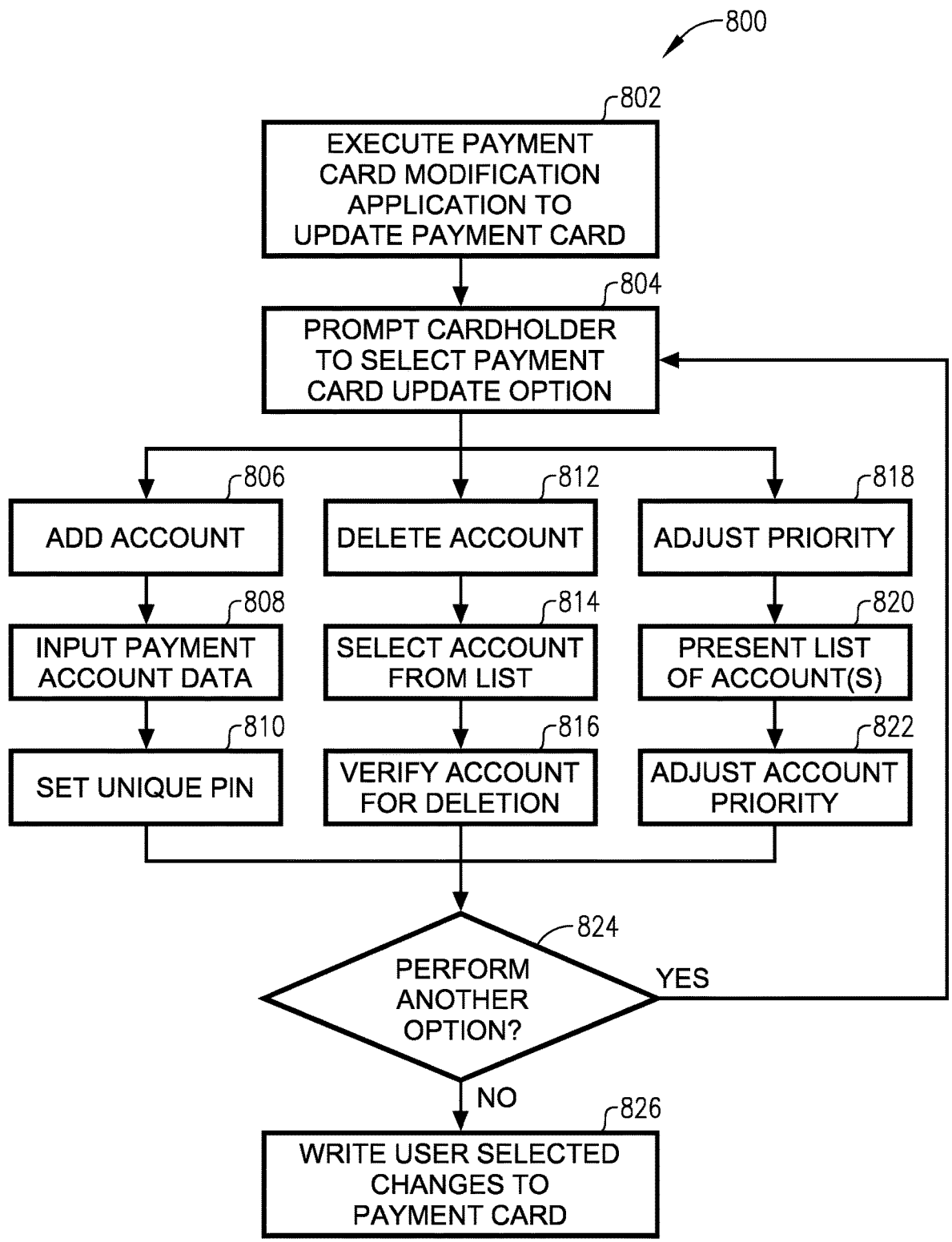
FIG. 8 is a flowchart illustrating a computer-implemented method for adding, deleting, and/or adjusting the use priority of two or more payments accounts stored on the multiple-funding source payment card shown in FIG. 1.

FIG. 8 is a flowchart illustrating an exemplary computer-implemented method 800 for adding, deleting, and/or adjusting the use priority of two or more payments accounts stored on the payment card 100. The operations described herein may be performed in the order shown in FIG. 8 or may be performed in a different order. Furthermore, some operations may be performed concurrently as opposed to sequentially. In addition, some operations may be optional.

The computer-implemented method 800 is described below, for ease of reference, as being executed by exemplary devices and components introduced with the embodiments illustrated in FIGS. 1-6. In one embodiment, the method 800 may be implemented by a user, such as the cardholder 402 (shown in FIG. 4). In the exemplary embodiment, the method 800 relates to the modification of payment accounts stored on the payment card 100 (shown in FIG. 1). While operations within the method 800 are described below regarding the cardholder 402, the method 800 may be implemented by the issuer 414 (shown in FIG. 1) and/or on other such computing systems and/or devices through the utilization of processors, transceivers, hardware, software, firmware, or combinations thereof. However, a person having ordinary skill will appreciate that responsibility for all or some of such actions may be distributed differently among parties (e.g., the acquirer, merchant, or issuer) and/or other computing devices without departing from the spirit of the present disclosure.

The computer-implemented method 800 facilitates a cardholder 402 to add or remove a payment account from the payment card 100 and/or adjust the priority order of use of the payment accounts included on the payment card 100. The cardholder may choose to update the card in several ways, including, for example, having the card updated by the issuing bank at a physical bank, or updating the payment card personally by using, for example, an ATM and/or a mobile device as shown in FIGS. 5 and 6.

At an operation 802, in an embodiment using an ATM and/or mobile device, the cardholder 402 may update the payment card 100 by running a payment card modification application (e.g., an application on the ATM or the mobile app 506 (shown in FIG. 5)). The application may read the card, for example, using an ATM card reader or the payment card reader/writer 504 (shown in FIG. 5), to load the card information into the application.

At operation 804, a graphical user interface (GUI) of the application presents to or otherwise prompts the cardholder 402 to select an option for updating the payment card 100. For example, and without limitation, the GUI may present an Add Account option 806, Delete Account option 812, and an Adjust Priority option 818 to the cardholder 414.

When the cardholder 402 selects the Add Account option 806, at operation 808, the cardholder 402 inputs various account data associated with the new payment account to be added. The account data may include, for example, and without limitation, the payment account or card number (e.g., the PAN), the cardholder name on the account, the account expiration date, a card verification value (CVV) number, and/or any other discretionary issuer data. At operation 810, the cardholder 402 may set a unique PIN for the newly added account. The PIN must be unique, i.e., different than any other PIN associated with any account stored on the payment card 100. This facilitates providing a layer of security against unauthorized use of the account stored on the payment card 100. In addition, the unique PIN facilitates cardholder selection of the payment account for use during a transaction event.

When the cardholder 402 selects the Delete Account option 812, at operation 814, the cardholder 402 is presented with a list of the payment accounts stored on the payment card 100. The cardholder may select one or more of the presented payment accounts, for example, by selecting a check box by the account name. After selection of the payment account(s) for deletion, the cardholder 402 may be prompted to verify the selection(s) at operation 816. This facilitates inadvertent deletion of an account when an improper selection was made by the cardholder 402.

When the cardholder 402 selects the Adjust Priority option 818, at operation 820, the cardholder 402 is presented with the payment accounts stored on the payment card 100, listed by priority. The cardholder may select or adjust the priority of one or more of the presented payment accounts at operation 822, for example, by selecting the accounts in order of priority, numbering the accounts in order of priority, selecting and dragging the accounts into a priority order, etc. In one embodiment, for example, the priority may be set based on the merchant type or industry in addition to or rather than by a simple numerical ordering/preference.

After each Add Account option 806, Delete Account option 812, and an Adjust Priority option 818 operation is completed, at operation 824 the cardholder is asked if he or she would like to perform another option. If the cardholder selects to perform another option, the method 800 returns to operation 804. If the cardholder selects not to perform another operation, the method 800 writes the changes to the payment card 100 at operation 826.

For example, when the payment card 100 is inserted into the ATM and/or the payment card reader/writer 504 (i.e., a CAD), the plurality of electrical contacts 104 of the micromodule 102 come into contact with corresponding contacts of the reader/writer 504. The reader/writer 504 may then write the changes requested by the cardholder 402 to the payment card 100. Alternatively, as shown in FIG. 5, wireless communications may be used with some payment cards to read/write data to and from the payment card 104.

Performing Multiple-Funding Source Payment Card

Figure 9A:
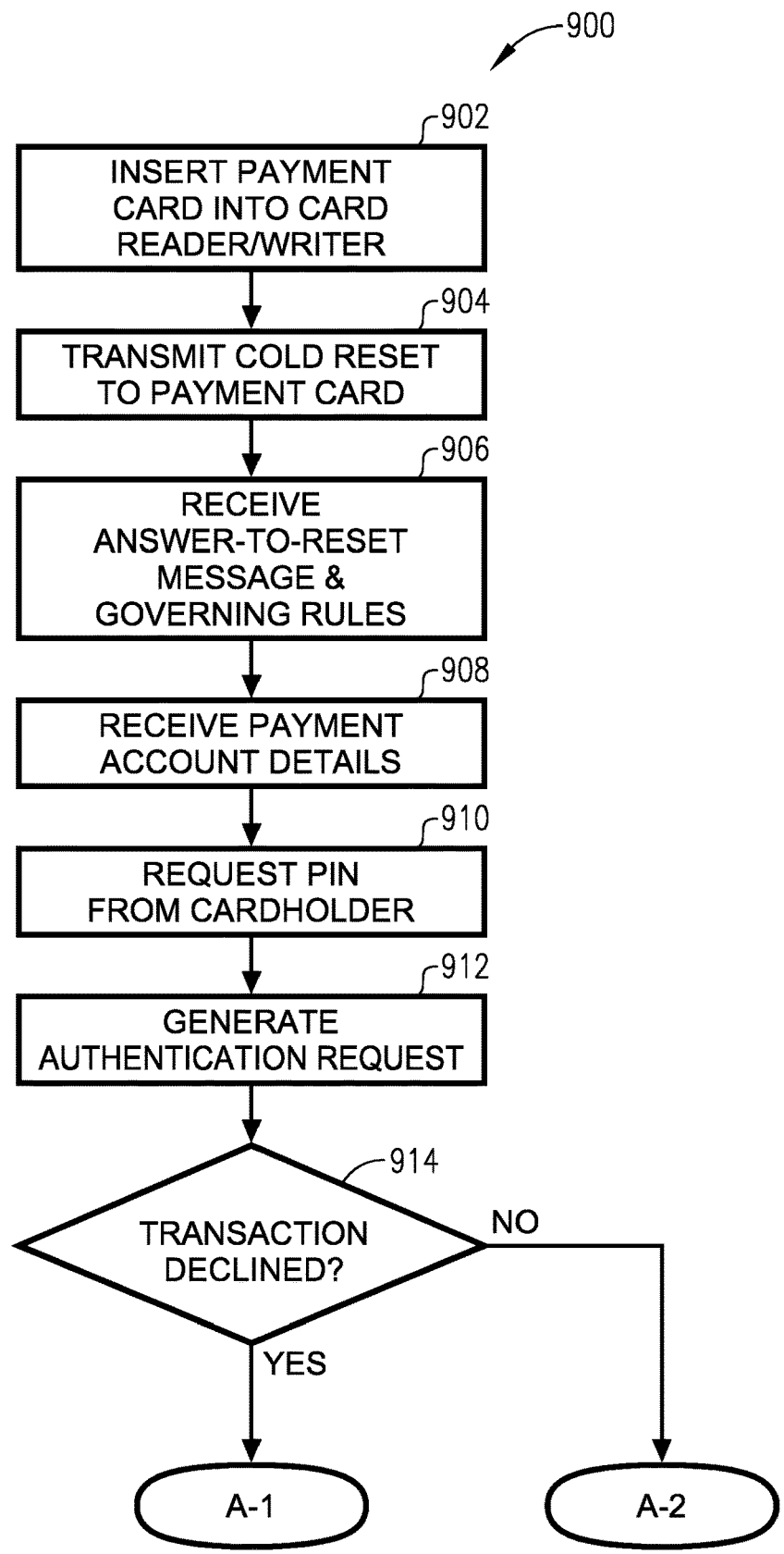

FIGS. 9A and 9B are flowcharts illustrating an exemplary computer-implemented method 900 for switching payment accounts during a single-swipe transaction. As used herein, a single-swipe transaction includes a single instance of swiping, tapping, or dipping of the payment card at the POS. As described herein, the transaction is performed using a multiple-funding source payment card, such as the payment card 100 (shown in FIG. 1). The operations described herein may be performed in the order shown in FIGS. 9A and 9B or may be performed in a different order. Furthermore, some operations may be performed concurrently as opposed to sequentially. In addition, some operations may be optional.

The computer-implemented method 900 is described below, for ease of reference, as being executed by exemplary devices and components introduced with the embodiments illustrated in FIGS. 1-6. In one embodiment, the method 900 may be implemented by a merchant, such as the merchant 404 (shown in FIG. 4). In the exemplary embodiment, the method 900 relates to switching between payment accounts during a transaction using the multiple-funding source payment card 100. While operations within the method 900 are described below regarding the merchant 404, the method 900 may be implemented by any other party to the transaction and/or on other such computing systems and/or devices through the utilization of processors, transceivers, hardware, software, firmware, or combinations thereof. However, a person having ordinary skill will appreciate that responsibility for all or some of such actions may be distributed differently among parties (e.g., the acquirer or issuer) and/or other computing devices without departing from the spirit of the present disclosure.

In an exemplary transaction, a cardholder, such as the cardholder 402 shown in FIG. 4, is shopping at a merchant, such as the merchant 404. The cardholder 402 is using the multiple-funding source payment card 100, which is loaded with payment accounts 302, 304, and 306, each payment account being associated with a different issuer and/or a different payment processing network. For example, and without limitation, the payment account 302 may be a Mastercard credit card account from State Bank A, payment account 304 may be a Visa debit account from State Bank B, and payment account 306 may be a Discover Card credit card account from National Bank C. The payment accounts may be registered and stored on the payment card 100 with a priority use order of (1) payment account 302, (2) payment account 304, and (3) payment account 306. Note that the cardholder 402 may select any order of use as desired and the order illustrated above is simply one example of many. In the exemplary embodiment, after the cardholder 402 has selected an item to purchase, the cardholder proceeds to pay for the item.

At operation 902, the cardholder 402 inserts the payment card 100 into the merchant POS 406 (shown in FIG. 4). The card reader 408 (shown in FIG. 4) reads the payment card 100. In particular, at operation 904, the card reader 408 transmits a cold reset signal to the micromodule 102 (shown in FIG. 1) of the payment card 100. This initial reset signal is a "cold reset" as defined by ISO/IEC 7816-3 standard and Part I of the EMV Integrated Circuit Card for Payment Systems Specification. For example, a cold reset is defined as a reset following the activation of the electrical contacts of a payment card (i.e., after the initial application of power and clock signals to the contacts), whereas a warm reset is defined as a reset following a cold reset while the power and clock signals are still applied to the payment card.

The payment card 100 responds with an Answer-to-Reset (ATR) message at operation 906. The ATR message informs the POS 406 of the governing rules for communication with and performing multiple funding source transactions using the payment card 100. For example, the governing rules indicate the priority of the payments accounts for use in authenticating the transaction. At operation 908, the POS 406 receives the payment account details of the first payment account from the payment card 100, according to the governing rules. At operation 910, the POS 406 requests the PIN associated with the payment account.

After the POS 406 receives the PIN, the POS 406 generates a payment authorization request message at operation 912. The payment authorization request message is transmitted to an interchange network, such as the interchange network 412 (shown in FIG. 4) for processing and further transmission to an issuing bank, such as the issuer 414 (shown in FIG. 4), for approval. At operation 914, in one embodiment, a payment authorization response message may be received from the issuing bank indicating the transaction is not declined, in which case the transaction is completed at operation 928. In another embodiment, a payment declined response message may be received from the issuing bank.

If a payment declined response message is received from the issuer 414, the card reader 408 of the POS 406 transmits a warm reset signal, at operation 916, to the micromodule 102 of the payment card 100 in accordance with the governing rules of the payment card. The warm reset signal facilitates a single swipe, tap, or dip of the payment card 100, eliminating the need to restart the transaction process as is required in known processing of multiple funding sources for transactions. After the warm reset is issued, the POS 406 receives a second ATR signal from the payment card 100 at operation 918. At operation 920, the POS 406 receives the payment account details of the second payment account from the payment card 100, according to the governing rules. At operation 922, the POS 406 requests the PIN associated with the payment account.

After the POS 406 receives the PIN, the POS 406 generates another payment authorization request message at operation 924. The payment authorization request message is transmitted to an interchange network associated with the payment account for processing and further transmission to an issuing bank for approval. In one embodiment, a payment authorization response message may be received from the issuing bank, in which case the transaction is completed at operation 928. In another embodiment, payment declined response message may be received from the issuing bank.

At operation 926, if a payment declined response message is received from the issuer, the method 900 checks the governing rules to determine whether the payment card has another payment account to try. If there is another payment account, the method 900 repeats the payment account request process beginning at operation 916 until a payment authorization response message is received or the payment card 100 indicates that there are no more payment accounts to try. If the governing rules indicate that there are no more payment accounts to try, the process ends with a declined transaction.

Any actions, functions, operations, and the like recited herein may be performed in the order shown in the figures and/or described above or may be performed in a different order. Furthermore, some operations may be performed concurrently as opposed to sequentially. Although the methods are described above, for the purpose of illustration, as being executed by an example system and/or example physical elements, it will be understood that the performance of any one or more of such actions may be differently distributed without departing from the spirit of the present invention.

A computer-readable storage media or medium comprising a non-transitory medium may include an executable computer program stored thereon and for instructing one or more processing elements to perform some or all of the operations described herein, including some or all of the operations of the computer-implemented method. The computer program stored on the computer-readable medium may instruct the processor and/or other components of the system to perform additional, fewer, or alternative operations, including those discussed elsewhere herein.

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processor," "processing element," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only and are thus not intended to limit in any way the definition and/or meaning of the term "processor." In particular, a "processor" may include one or more processors individually or collectively performing the described operations. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EEPROM), and non-volatile RAM (NVRAM) memory. The above memory types are example only and are thus not limiting as to the types of memory usable for storage of a computer program.

The terms "computer," "computing device," "computer system," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "network," "communications network," and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, Wi-Fi, IEEE 802 including Ethernet, WiMAX, and/or others), including supporting various local area networks (LANs), personal area networks (PAN), or short-range communications protocols.

The term "communication component," "communication interface," and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory area," "storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it is understood that equivalents may be employed, and substitutions made herein without departing from the scope of the invention as recited in the claims.

Having thus described one or more embodiments of the invention, what is claimed as new and desired to be protected by Letters Patent includes the following:

What is claimed is:

1. A computer-implemented method for switching payment accounts during a single-swipe transaction using a multiple-funding source payment card, said method comprising the operations of:
    transmitting a cold reset signal to the multiple-funding source payment card;
    receiving a first answer-to-reset message from the multiple-funding source payment card, the first answer-to-reset message including governing rules for performing the single-swipe transaction;
    receiving payment account details for a first payment account in accordance with the governing rules;
    receiving a first PIN input by a cardholder, the first PIN associated with the first payment account;
    transmitting a first payment authorization request message for approval of the single-swipe transaction;
    receiving a payment declined response message;
    transmitting a warm reset signal to the multiple-funding source payment card in accordance with the governing rules;
    receiving a second answer-to-reset message from the multiple-funding source payment card;
    receiving payment account details for a second payment account in accordance with the governing rules;
    receiving a second PIN input by the cardholder, the second PIN associated with the second payment account; and
    transmitting a second payment authorization request message for approval of the single-swipe transaction.

2. The computer-implemented method in accordance with claim 1 further comprising:
    receiving, from the cardholder, the multiple-funding source payment card at a point-of-sale device.

3. The computer-implemented method in accordance with claim 1 further comprising:
    generating the first payment authorization request message and the second payment authorization request message.

4. The computer-implemented method in accordance with claim 1 further comprising:
    receiving a second payment declined response message in response to the second payment authorization request message.

5. The computer-implemented method in accordance with claim 4 further comprising:
    evaluating the governing rules to determine whether the multiple-funding source payment card includes a third payment account.

6. The computer-implemented method in accordance with claim 5 further comprising:
    if the multiple-funding source payment card includes a third payment account, transmitting a warm reset signal to the multiple-funding source payment card in accordance with the governing rules;
    receiving payment account details for the third payment account in accordance with the governing rules;
    receiving a third PIN input by the cardholder, the third PIN associated with the third payment account; and
    transmitting a third payment authorization request message for approval of the single-swipe transaction.

7. The computer-implemented method in accordance with claim 5 further comprising:
    determining that the multiple-funding source payment card does not include a third payment account stored thereon; and
    terminating the single-swipe transaction.

8. A system for switching payment accounts during a single-swipe transaction, said system comprising:
    a multiple-funding source payment card comprising a micromodule having a memory storing at least payment account details for a first payment account having a first PIN associated therewith, payment account details for a second payment account having a second PIN associated therewith, and governing rules for performing the single-swipe transaction; and
    a point-of-sale device comprising a payment card reader component, said point-of-sale device configured to:
        transmit a cold reset signal to said micromodule of said multiple-funding source payment card;
        receive a first answer-to-reset message from said micromodule, the first answer-to-reset message including the governing rules;

receive the payment account details for the first payment account in accordance with the governing rules;

request from a cardholder, via input into the point-of-sale device, the first PIN;

transmit a first payment authorization request message for approval of the single-swipe transaction;

receive a payment declined response message;

transmit a warm reset signal to said micromodule in accordance with the governing rules;

receive a second answer-to-reset message from said micromodule;

receive the payment account details for the second payment account in accordance with the governing rules;

request from the cardholder, via input into the point-of-sale device, the second PIN; and transmit a second payment authorization request message for approval of the single-swipe transaction.

9. The system in accordance with claim 8, said payment card reader component configured to receive, from the cardholder, the multiple-funding source payment card.

10. The system in accordance with claim 8, said point-of-sale device further configured to generate the first payment authorization request message and the second payment authorization request message.

11. The system in accordance with claim 8, said point-of-sale device further configured to receive a second payment declined response message in response to the second payment authorization request message.

12. The system in accordance with claim 11, said point-of-sale device further configured to, upon receipt of the second payment declined response message, evaluate the governing rules to determine whether said micromodule includes payment details for a third payment account, including a third PIN associated with the third payment account.

13. The system in accordance with claim 12, said point-of-sale device further configured to:

determine that said micromodule includes payment details for a third payment account, including a third PIN associated with the third payment account;

transmit a warm reset signal to said micromodule in accordance with the governing rules;

receive the payment account details for the third payment account in accordance with the governing rules;

request from the cardholder, via input into the point-of-sale device, the third PIN; and transmit a third payment authorization request message for approval of the single-swipe transaction.

14. The system in accordance with claim 12, said point-of-sale device further configured to:

determine that said micromodule does not include a third payment account stored thereon; and terminate the single-swipe transaction.

\* \* \* \* \*